United States Patent [19]

Dietrich et al.

[11] Patent Number: 4,602,181
[45] Date of Patent: Jul. 22, 1986

[54] BRUSH HOLDER ASSEMBLY FOR USE IN ELECTRIC MACHINES

[76] Inventors: Wolfgang Dietrich, Fernsichtstrasse 19, CH-8200 Schaffhausen; Michael Dietrich, Undere Schluchten, CH-8197 Rafz, both of Switzerland

[21] Appl. No.: 668,238

[22] Filed: Nov. 5, 1984

[51] Int. Cl.⁴ ............................................. H02K 13/00
[52] U.S. Cl. ...................................... 310/241; 310/42; 310/71; 310/242; 310/248
[58] Field of Search ............... 310/239, 240, 241, 242, 310/244, 245, 246, 247, 238, 42, 71, 248

[56] References Cited

U.S. PATENT DOCUMENTS

| | | | |
|---|---|---|---|
| 1,517,281 | 12/1924 | Ehrlich | 310/241 |
| 1,577,749 | 3/1926 | McDonald | 310/239 |
| 1,808,747 | 6/1931 | Apple | 310/239 |
| 2,379,176 | 6/1945 | Mulheim | 310/239 |
| 2,862,123 | 11/1958 | Arsenault | 310/241 |
| 4,471,254 | 9/1984 | Yamada | 310/242 |

FOREIGN PATENT DOCUMENTS 2701161 7/1978 Fed. Rep. of Germany ...... 310/241

*Primary Examiner*—R. Skudy
*Attorney, Agent, or Firm*—Peter K. Kontler

[57] ABSTRACT

A brush holder assembly for use in an electric motor or generator has an insulating ring one side of which carries a set of several equidistant carriers for brushes which are biased in the radial direction of the ring to bear against a slip ring or against a commutator. Each carrier is radially adjustably secured to the ring by two screws or bolts and nuts whose shanks extend through two elongated slots provided in a flange-like extension of the carrier. Each extension has a tongue extending into a radial groove in the one side of the ring. The axial position of each carrier relative to the ring can be changed by inserting one or more shims between the extension and the ring.

11 Claims, 7 Drawing Figures

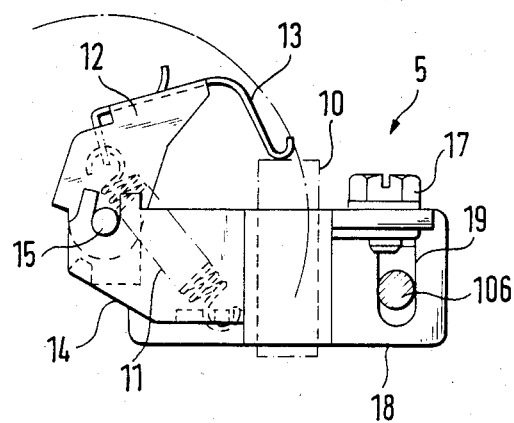
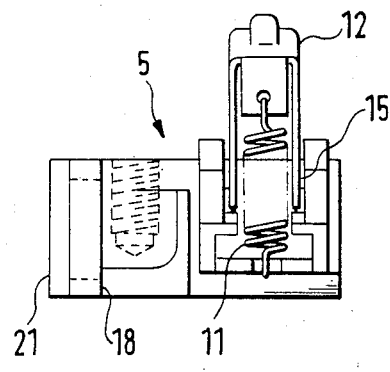
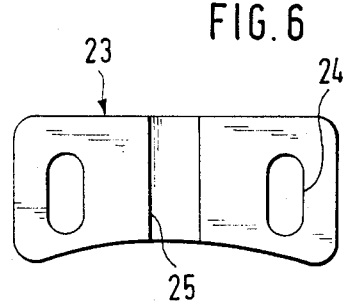
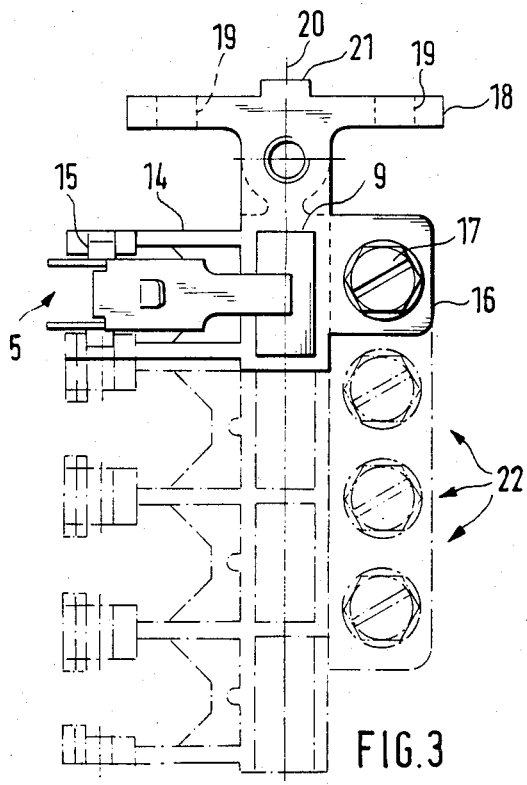
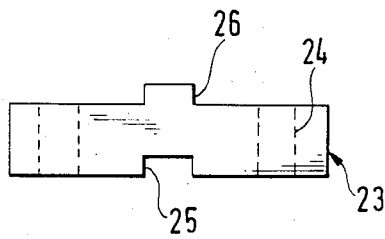

BRUSH HOLDER ASSEMBLY FOR USE IN ELECTRIC MACHINES

BACKGROUND OF THE INVENTION

The present invention relates to current conducting brushes in general, and more particularly to improvements in brush holder assemblies for use in electric machines such as d-c motors, a-c motors and generators. Still more particularly, the invention relates to improvements in assemblies of the type wherein one or more brushes are movably mounted in carriers or clips which are separably affixed to a ring-shaped holder made of an insulating material. Such brushes can be used to supply current to or to receive current from a commutator or a slip ring, depending on the nature of the electric machine.

In heretofore known brush holder assemblies, the brushes are mounted on bridge-like holders which maintain them in contact with the rotating part or parts of the electric machine, such as a motor or a generator. The conventional bridge-like holders include at least one ring which is adjacent to a slip ring or to a commutator and supports a carrier wherein an adjustable brush is mounted in such a way that it can bear against the periphery of the rotating part of the machine in order to establish the required electrical connection. The just described brush holder assemblies are especially popular in relatively small machines, i.e., when the diameter of the aforementioned ring-shaped holder is relatively small. Such brush holder assemblies are used less frequently or not at all if the diameter of the commutator is rather large. Regardless of their intended or actual use, conventional brush holder assemblies of the above outlined character exhibit the drawback that they must be furnished in a large number of different sizes and shapes, one for each of a wide variety of differently dimensioned commutators or slip rings. In addition, it is necessary to provide a large number of differently dimensioned and/or configurated ring-shaped holders to accept differently configurated and/or dimensioned brush carriers. The various parts of such conventional assemblies must be manufactured in specially designed machines and by resorting to specially designed tools so that they can be produced at a reasonable cost only in large or extremely large numbers.

Attempts to overcome the drawbacks of the above outlined conventional brush holder assemblies include the provision of substantially straight ruler-shaped arms each of which supports a battery of brushes so that a selected brush of each battery can be used in conjunction with a particular commutator or with a particular slip ring. Thus, each brush of each battery of brushes is disposed at a different radial or axial distance from the ring-shaped holder for the carriers. The utilization of straight arms with batteries of brushes thereon enhances the versatility of the brush holder assemblies but it also contributes to the cost because the positions of brushes in each of the batteries must be selected and maintained with a very high degree of accuracy. Moreover, elongated arms which support the batteries of brushes are prone to vibration in response to vibration of the respective machine and this affects the flow of current between the selected brushes and the rotary part or parts which are in contact with the brushes.

OBJECTS AND SUMMARY OF THE INVENTION

An object of the invention is to provide a novel and improved brush holder assembly which is at least as simple as but much more versatile and less expensive than heretofore known assemblies.

Another object of the invention is to provide a brush holder assembly which is more compact than heretofore known assemblies and which is less likely to be affected by vibrations of the moving parts of the electric machine.

A further object of the invention is to provide a brush holder assembly wherein the brushes and their carriers are mounted on the insulating holder in a novel and improved way.

An additional object of the invention is to provide a brush holder assembly which can be used to conduct current to or to receive current from large or small rotary parts with the same degree of reliability.

Still another object of the invention is to provide a novel and improved method of mounting several brushes on a ring-shaped holder of insulating material.

A further object of the invention is to provide a brush holder assembly wherein the position of each brush with reference to the ring-shaped holder can be changed within a wide range, not only in the radial but also in the axial direction of the holder.

The invention is embodied in a brush holder assembly for use in electric machines such as motors or generators. The improved assembly comprises a ring-shaped insulating holder, at least one brush carrier, and means for radially and axially adjustably affixing the carrier to the holder. The affixing means can comprise an extension which is provided on the carrier and has two elongated slots, and fastener means extending through such slots and serving to secure the extension to the holder. When the fastener means are loosened, the carrier can be shifted in the radial direction of the holder. To this end, the holder is preferably provided with a radially extending groove and the extension has a tongue which is radially movably received in such groove. It is also possible to provide the tongue on the holder and to provide the groove in the extension. The slots of the extension are preferably mirror symmetrical to each other with reference to the central axis of a brush which is installed in a receptacle of the carrier in such a way that it can move radially of the holder.

The affixing means can further comprise one or more shims or otherwise configurated distancing elements which can be inserted between one side of the ring-shaped holder and the extension of the carrier to thus change the axial position of the carrier with reference to the holder. Each distancing element can have a tongue at one of its sides to extend into the radial groove of the holder and a groove at its other side to receive the tongue of the extension.

The assembly can comprise two or more carriers which are equidistant from one another, as considered in the circumferential direction of the ring-shaped holder, and each of which is adjacent to one and the same side or end face of the holder. The affixing means is then arranged to establish a radially and axially adjustable connection between each carrier and the ring-shaped holder. The means for biasing the brush or brushes can comprise coil springs and/or leaf springs provided on or in the respective carriers and serving to urge the brushes in the radial direction of the ring-shaped holder.

The novel features which are considered as characteristic of the invention are set forth in particular in the appended claims. The improved assembly itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a plan view of a brush carrier or clip which can be affixed to the brush holder of FIGS. 1 and 2;

FIG. 4 is a side elevational view of the brush carrier which is shown in FIG. 3;

FIG. 5 is an end elevational view of the brush carrier;

FIG. 6 is a plan view of a distancing element which can be used to change the axial position of a brush carrier with reference to the holder; and FIG. 7 is a side elevational view of the distancing element which is shown in FIG. 6.

DESCRIPTION OF THE PREFERRED EMBODIMENTS

Figure 1:
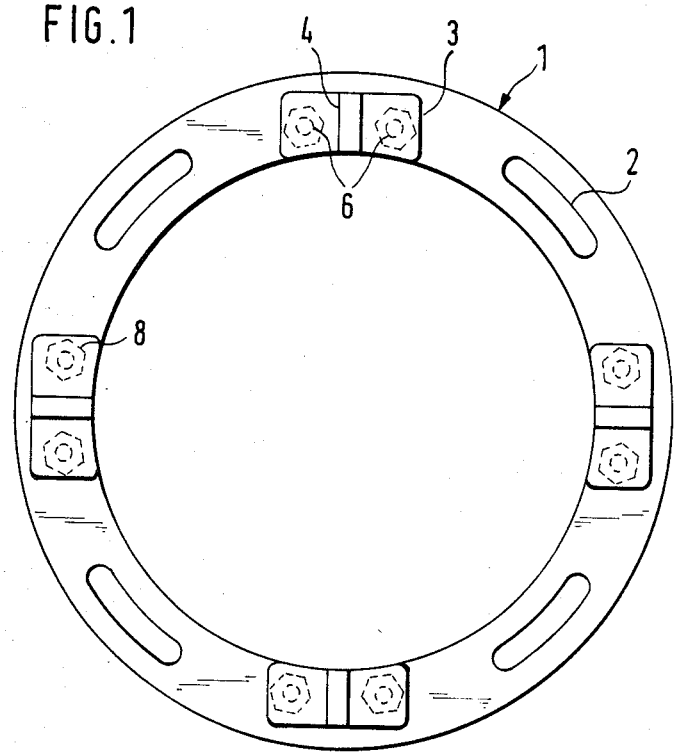
FIG. 1 is a plan view of a ring-shaped brush holder which forms part of the improved assembly and has four equidistant projections or platforms for discrete brush carriers.
Figure 2:
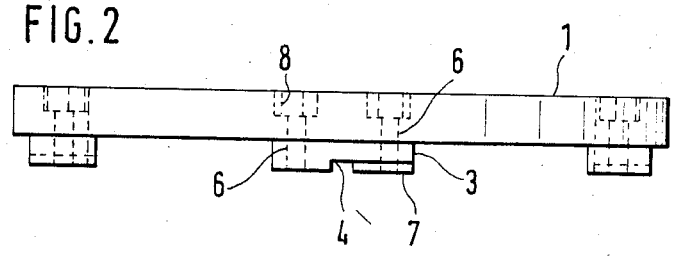
FIG. 2 is a side elevational view of the brush holder.

FIGS. 1 and 2 show a ring-shaped insulating holder 1 for a set of four brushes or four batteries of brushes 10 one of which is shown in FIG. 4. The holder 1 has four equidistant openings in the form of elongated arcuate slots 2 for reception of screws or other types of fasteners which secure it to the stator of an electric machine. The slots 2 alternate with projections or platforms 3 which extend axially from one side or end face of the ring-shaped holder 1 and whose exposed surfaces have radially extending guide grooves 4. Each of the four projections 3 (which are angularly offset by 90° relative to each other) serves to support a discrete brush carrier 5 (see FIGS. 3–5). The holder 1 is further formed with four pairs of axially parallel holes or bores 6 which extend all the way between its two sides or end faces and serve for reception of screws or bolts and nuts 106 (see FIG. 4) which secure the carriers 5 to the respective projections 3 in such a way that each carrier 5 is urged against a supporting surface 7 of the respective projection. Those end portions 8 of the holes or bores 6 which are remote from the respective projections 3 have polygonal (e.g., hexagonal) cross-sectional outlines to prevent rotation of the heads of bolts or of nuts which are used to secure the carriers 5 to the respective projections.

Each brush carrier 5 (one of these carriers is shown in FIGS. 3 to 5) comprises a receptacle 9 for the respective brush 10 which can be made of carbon and is movable radially toward the adjacent slip ring or commutator, not shown. The brush 10 is biased by a coil spring 11 one end portion of which is anchored in the carrier 5 and the other end portion of which is attached to a pivotable pressure applying member 12 having a suitably curved damping spring 13 bearing directly against the adjacent outer end face of the brush 10 and constituting a leaf spring. The pressure applying member 12 is pivotable in holding arms 14 and is movably affixed thereto by pivot pins 15.

The receptacle 9 of the carrier 5 is conductively connected with a clamping device 16 in the form of a strip which is provided with an electric terminal 17, e.g., a terminal in the form of a screw whose head can cooperate with the clamping device 16 to clamp a wire-like conductor not shown in the drawings.

The brush carrier 5 further comprises an extension 18 in the form of a flange having a pair of elongated axially parallel slot-shaped apertures 19. The apertures or slots 19 are mirror symmetrical to each other with reference to a plane including the central axis 20 of the brushes 10, i.e., the distance between the axis of each hole 19 and the axis 20 is the same. That side of the extension or flange 18 which is to be adjacent to the respective projection 3 has a tongue 21 arranged to enter the corresponding groove 4. The reference character 22 denotes how the carrier 5 can be provided with receptacles for additional brushes (the parts denoted by the character 22 are indicated by phantom lines because they are optional).

The improved assembly can be furnished with one or more distancing elements or shims 23 of the type shown in FIGS. 6 and 7. Each such element can be installed between an extension 18 and the respective projection 3 of the brush holder 1. The illustrated distancing element 23 has a tongue 26 at one of its sides and a groove 25 at the other side opposite the tongue 26. Furthermore, the distancing element 23 has elongated slot-shaped holes 24 which register with the slots 19 of the respective extension 18. When the distancing element 23 is put to use, its tongue 26 fits into the groove 4 of the respective projection 3 and its groove 26 receives the tongue 21 of the respective extension 18.

In order to affix it to the holder 1, the carrier 5 of FIGS. 3 to 5 is placed against the selected projection 3 so that the outer side of its extension 18 abuts against the surface 7 and the tongue 21 enters the groove 4 of the selected projection 3. The fastener means 106 are then introduced into the holes 6 of the holder 1 and the respective aligned slots 19 to releasably but fixedly secure the extension 18 to the selected projection 3. The slots 19 are elongated so that they allow for adjustment of the carrier 5 relative to the corresponding projection 3, as considered in the radial direction of the holder 1 (i.e., in the longitudinal direction of the respective groove 4). The axial position of the carrier 5 relative to the corresponding projection 3 can be changed by inserting a relatively thick or a relatively thin distancing element 23 of the type shown in FIGS. 6 and 7 or by using a stack of two or more distancing elements. The selected distancing element or elements 23 are installed between the exposed surface of the extension 18 and the surface 7 of the projection 3 so that a tongue 26 enters the groove 4 and a groove 25 receives the tongue 21. The screws or bolts and nuts 106 which are used to secure the carrier 5, or the carrier 5 and one or more distancing elements 23, to the corresponding projection 3 of the holder 1 are long enough to extend through the respective holes 6, through the respective slots 24 of one or more distancing elements 23 and through the slots 19 of the extension 18.

The slots 19 of each extension 18 allow for radial adjustability of the respective carrier 5 to any one of a practically infinite number of different positions, as considered radially of the holder 1, as soon as the corresponding fastener means 106 are loosened or removed.

The feature that each extension 18 has a tongue 21 which fits snugly into but is movable in the corresponding radially extending groove 4 of the holder 1 ensures that the adjustment of the carrier 5 takes place exactly radially of the holder.

If the operator wishes to change the axial distance between the extensions 18 of the carriers 5 and the respective side or end face of the holder 1, the operator inserts one or more distancing elements 23 into or removes one or more distancing elements from the spaces between the extensions 18 and the respective side of the holder 1. The provision of tongues 26 and grooves 25 on the distancing elements 23 ensures that the accuracy of radial positioning of the carriers 5 is not affected due to insertion of distancing elements between such carriers and the holder 1.

An important advantage of the improved brush holder assembly is its simplicity and versatility. Moreover, the assembly is inexpensive and ensures highly accurate positioning of the carriers 5 in the radial and/or axial direction of the holder 1. The holder 1 can be furnished with several sets of differently dimensioned carriers 5 for discrete brushes or for entire batteries of brushes. Each carrier has a tongue 21 which fits into a groove 4 of the holder 1 to thus further enhance the versatility of the improved assembly. This is not possible in the aforediscussed conventional assemblies wherein each arm carries a battery of brushes because it would be necessary to drill a fresh set of holes whenever a first arm is replaced with a different second arm.

Another important advantage of the improved assembly is that the carriers 5 are compact so that they are much less likely to vibrate when the assembly is in actual use in a motor or generator. The likelihood of vibration is further reduced due to the fact that the entire assembly is a surprisingly compact structure.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A brush holder assembly for use in electric machines, comprising a ring-shaped insulating holder having at least one end face; at least one brush carrier; and means for radially and axially adjustably affixing said carrier to said holder, said affixing means including an extension which is provided on said carrier and comprises an elongated flange, and said flange having an elongated surface facing said one end face, said affixing means further including first and second fastener means spaced longitudinally of said flange and arranged to secure the latter to said holder.

2. The brush holder assembly of claim 1, wherein said flange has two elongated slots and said fastener means extend through said slots.

3. The brush holder assembly of claim 2, further comprising a brush movably installed in said carrier and having a central axis, said slots being mirror symmetrical to each other with reference to a plane including said axis.

4. The brush holder assembly of claim 1, wherein said holder has a radially extending groove and said flange has a tongue extending into said groove.

5. The brush holder assembly of claim 1, wherein one of the parts including said holder and said flange has a tongue extending radially of said holder and the other of said parts has a groove for said tongue.

6. The brush holder assembly of claim 1, wherein said affixing means includes an elongated distancing element disposed intermediate said flange and said holder, and fastener means separably securing said holder, said flange and said distancing element to each other.

7. The brush holder assembly of claim 1, wherein said fastener means are capable of releasably securing said flange to said holder in any one of a plurality of different positions, as considered in the radial direction of said holder.

8. The brush holder assembly of claim 7, wherein said affixing means further comprises a distancing element which is separably installed between said holder and said flange so that the latter is located at a first distance from said one side of end face holder, as considered in the axial direction of said holder, when said distancing element is installed between said holder and said flange and at a different second distance when said distancing element is removed and said flange is secured directly to said holder.

9. The brush holder assembly of claim 7, comprising a plurality of carriers which are equidistant from each other, as considered in the circumferential direction of said holder, said affixing means including means for releasably securing each of said carriers to said holder in any one of a plurality of different positions, as considered in the radial direction of said holder.

10. The brush holder assembly of claim 1, further comprising a brush which is movably mounted in said carrier, said carrier having means for biasing said brush in the radial direction of said holder.

11. A brush holder assembly for use in electric machines, comprising a ring-shaped insulating holder having an end face provided with a radially extending groove; at least one brush carrier; and means for radially and axially adjustably affixing said carrier to said holder, said affixing means including an extension provided on said carrier, a distancing element disposed intermediate said extension and said holder, and fastener means separably securing said holder, said extension and said distancing element to each other, said distancing element having a first side provided with a tongue extending into said groove, and a second side opposite said first side and having a groove extending radially of said holder, and said extension having a tongue extending into the groove of said distancing element.

* * * * *